United States Patent

[11] 3,574,892

| [72] | Inventor | Joseph E. Smith<br>Birmingham, Mich. |
|---|---|---|
| [21] | Appl. No. | 794,196 |
| [22] | Filed | Jan. 27, 1969 |
| [45] | Patented | Apr. 13, 1971 |
| [73] | Assignee | Wolverine-Pentronix, Inc.<br>Lincoln Park, Mich. |

[54] POWDER COMPACTING PRESS
8 Claims, 10 Drawing Figs.

[52] U.S. Cl. .................................................. 18/16,
25/103
[51] Int. Cl. ...................................................... B30b 7/00,
B30b 11/04
[50] Field of Search .......................................... 18/16 (M)
(F), 16.5, 16.7

[56] References Cited
UNITED STATES PATENTS

| 3,328,840 | 7/1967 | Vinson | 18/16F |
| 3,382,540 | 5/1968 | Van De Moden et al. | 18/16.5 |
| 3,414,940 | 12/1968 | Vinson | 18/16M |
| 3,469,283 | 9/1969 | Vinson | 18/16M |

*Primary Examiner*—J. Howard Flint, Jr.
*Attorney*—Hauke, Gifford and Patalidis

ABSTRACT: A punch and die assembly and work station positioner for a powder-compacting press including a die plate and a tool capsule containing a punch or punches for reciprocation therein which is formed as a unit with the die plate and a multiple work station positioner assembly angularly movably positioned over the die plate, the die plate being provided with a plurality of substantially linearly arranged die cavities adapted to be filled with powdered material in a first position of the work station positioner and for receipt of similarly arranged punches to compress the powder between the punches and an anvil in a second position of the work station positioner, and to eject the compressed articles from the die cavities in a third position of the work station positioner for discharge through similar linearly arranged discharge apertures in the first position of the work station positioner.

Patented April 13, 1971

INVENTOR
JOSEPH E. SMITH

BY Hauke, Kraus, Gifford, & Patalidis
ATTORNEYS

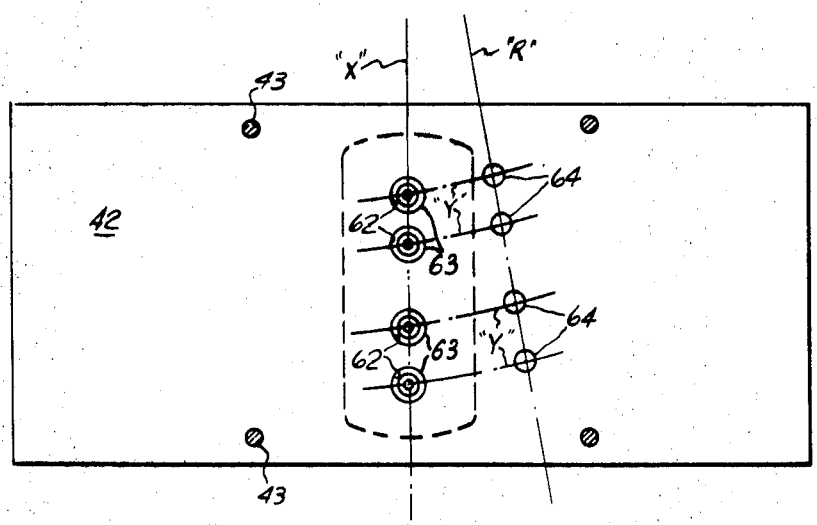
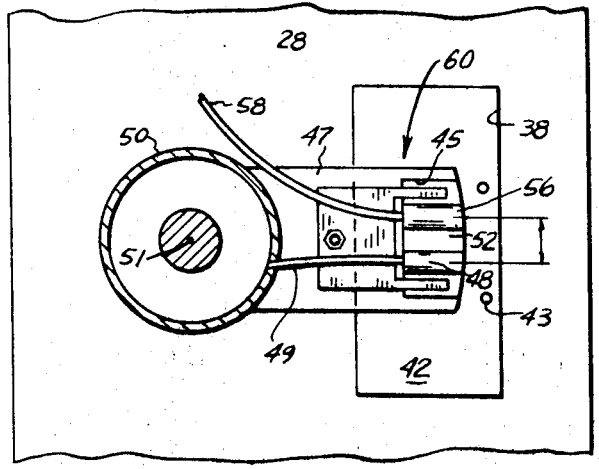
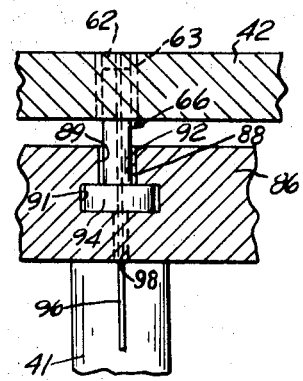
INVENTOR
JOSEPH E. SMITH
ATTORNEYS

INVENTOR
JOSEPH E. SMITH

BY Hauke, Kraus, Gifford, & Patalidis
ATTORNEYS

INVENTOR
JOSEPH E. SMITH

ATTORNEYS

POWDER COMPACTING PRESS

REFERENCE TO RELATED APPLICATIONS

The present invention is in substance related to applications, Ser. No. 450,427, filed Apr. 23, 1965 (now abandoned); Ser. No. 529,733 and Ser. No. 529,734, filed Feb. 23, 1966, (now U.S. Pat. Nos. 3,328,840 and 3,344,213 respectively; Ser. No. 529,842, filed Feb. 24, 1966 (now U. S. Pat. No. 3,328,842); Ser. Now. 544,285, filed Apr. 21, 1966, (now U.S. Pat. No. 3,414,940); and Ser. No. 618,230, filed Feb. 23, 1967 (now U.S. Pat. No. 3,415,142);

BACKGROUND OF THE INVENTION

1. Field Of The Invention

The present invention relates to powder compacting presses and more particularly to an improved punch and die set assembly and work station positioner for such presses having novel means providing an improved operation of the powder compacting press.

2. Description Of The Prior Art

The present invention is an improvement over punch and die assemblies and work station positioners of the character provided as part of a powder compacting press, as for example disclosed in U. S. Pats. Nos. 3,328,840, 3,328,842 and copending application Ser. No. 544,285, filed Apr. 21, 1966. The powder compacting press and punch and die assembly described and claimed in the above referred to patents and copending patent application consist of a machine for the purpose of manufacturing cores, beads, pellets and the like, made of powdered ferrite, glass or other comparable powder substances capable of forming a compacted article upon the application of a pressure in a confined die cavity.

In the embodiment of the powder compacting presses as disclosed in the aforementioned U.S. patents and copending application, the articles are compacted and formed in a multicavity die-forming part of the punch and die set. The finished articles are automatically ejected from the die cavities, picked up by a pickup head and dropped through discharge ports to fall into suitable containers. A work station positioner assembly, which is part of the press, is mounted angularly transversely movable over the die plate and carries a powder dispenser, an anvil and a pickup head. The powder dispenser, which is supplied with powder from a primary powder supply means connected thereto by means of a flexible tubing or the like, is first positioned over the die cavity or cavities, to be filled with powder as the punches are displaced downwardly so as to draw a predetermined amount of powder within the die cavities, the dispenser is then removed from above the die cavity or cavities by subsequent motion of the station positioner assembly and the anvil is in turn positioned over the die cavities.

The powder in each die cavity is compacted against the anvil as a result of an upward motion on the punches. The anvil is then removed from its position over the die cavity or cavities and is replaced by the pickup head by a further angular motion of the work station positioner. The punches are further displaced upwardly so as to bring their upper ends in substantial flush alignment with the surface of the die plate such that the finished compacted articles are ejected from the die cavities to be picked up by the pickup head. As a result of the angular return motion of the station positioner to the initial fill position, the pickup head is removed from over the die cavities and is disposed over one or a series of discharge apertures arranged in a disposition similar to the arrangement of the die cavities in the die, and the finished articles are dropped through the discharge aperture or apertures into a container or separate containers.

In the aforementioned U. S. Patents and copending patent application, the punch and die assembly for forming articles of tabletlike shape comprises a die plate having one or a plurality of equiangularly spaced apertures arranged in a circle, which are each provided with a die bushing so as to define the die cavities to be filled with powdered material.

A punch is associated with each of the die cavities and is adapted to be displaced in the die cavities for compression of the powder therein. In certain instances, where it is desired to compact articles having a centrally disposed aperture such as toroidal article, a stationary core rod is associated with each of the punches, the core rod being axially adjustable within a longitudinal bore in the punch.

Because, as hereinbefore mentioned, the die cavities and the punches are disposed in a circle, the diverse work stations associated with the work station positioner are also of circular shape or at least of such dimension as enables each work station to accommodate the circularly arranged die cavities when placed in position over the cavities. This requires a relative wide spacing from center to center of adjacent work stations and, similarly, a wide spacing from the center of the die cavities to the center of the discharge apertures. This arrangement causes a relatively wide swinging movement of the station positioner across the die plate. This condition is further compounded by the relative position of the individual work stations which may be defined in their proper order of operations as fill station, press station and the eject station. In presses employing circularly arranged die cavities and discharge apertures, the relative disposition of the work stations results in a certain amount of overlap in the movement of the oscillating arm of the station positioner during any one work cycle. This, together with the substantial amount of angular displacement of the positioner arm, causes a considerable reduction in the speed of the press operation and causes increased wear on the bearings and cam mechanism of the press due to the excessive angular movement of the station positioner.

SUMMARY OF THE INVENTION

In accordance with the present invention, an improved die cavity and discharge aperture arrangement, and improved arrangement of the work stations have been provided by which the angular oscillating movement of the station positioner arm has been considerably reduced to thus reduce cost, wear and tear of the press as well as simplifying the cam design for the work station positioner, and to increase the speed of the press operation.

This has been accomplished by arranging the die cavities and the discharge apertures linearly instead of in a circle, and by disposing the discharge apertures closely adjacent to the die cavities, but in an angularly offset position relative to the die cavities corresponding to the radius described by the oscillating arm of the station positioner during a work cycle. Concurrently with this novel arrangement, the diverse work stations on the oscillating arm of the station positioner have been arranged such as to place the press station between the fill and the eject station to eliminate any unnecessary overlap or retrace movements of the oscillating positioner arm. Due to the arrangement of the die cavities on a line rather than on a circle, the individual work stations are substantially narrow which permits their centers to be relatively close together and further permits the discharge apertures to be placed closer to the die cavities, thus considerably reducing the total angular movement of the oscillating arm of the station positioner.

Further advantages of the present invention will become apparent to one skilled in the art by reference to the following detailed description taken in connection with the drawings which illustrate a preferred embodiment.

BRIEF DESCRIPTION OF THE DRAWINGS

FIG. 3 is an enlarged top plan view of the oscillating arm of the station positioner embodying the present invention;

FIG. 4 is a top plan view of a die plate illustrating the present novel arrangement of the die cavities and discharge apertures as seen along line 4–4 of FIG. 5;

FIG. 7 is a vertical cross section through the die plate and punch holder of FIG. 5 as seen along line 7–7 thereof;

DETAILED DESCRIPTION OF THE PREFERRED EMBODIMENT

Although the powder-compacting press mechanism in which the improved punch and die set assembly of the present invention is embodied forms no part of the invention herein disclosed, a brief summary of the construction and operation of an exemplary press is given hereafter for the sake of clarity.

Figure 1:
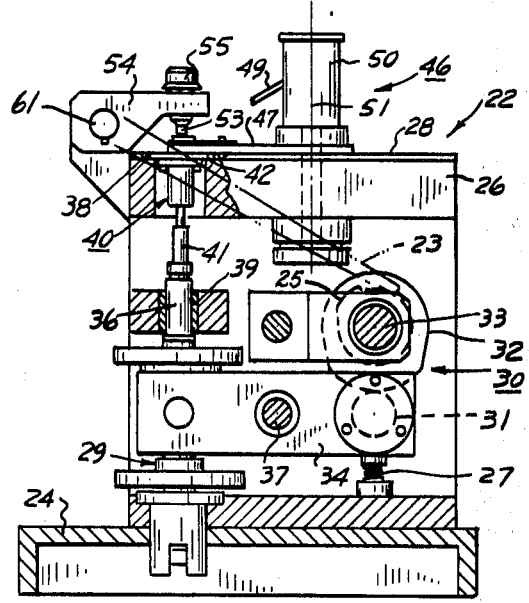
FIG. 1 in the drawings represents a schematic side view, partly in cross section, of a powder compacting press embodying the present invention.
Figure 2:
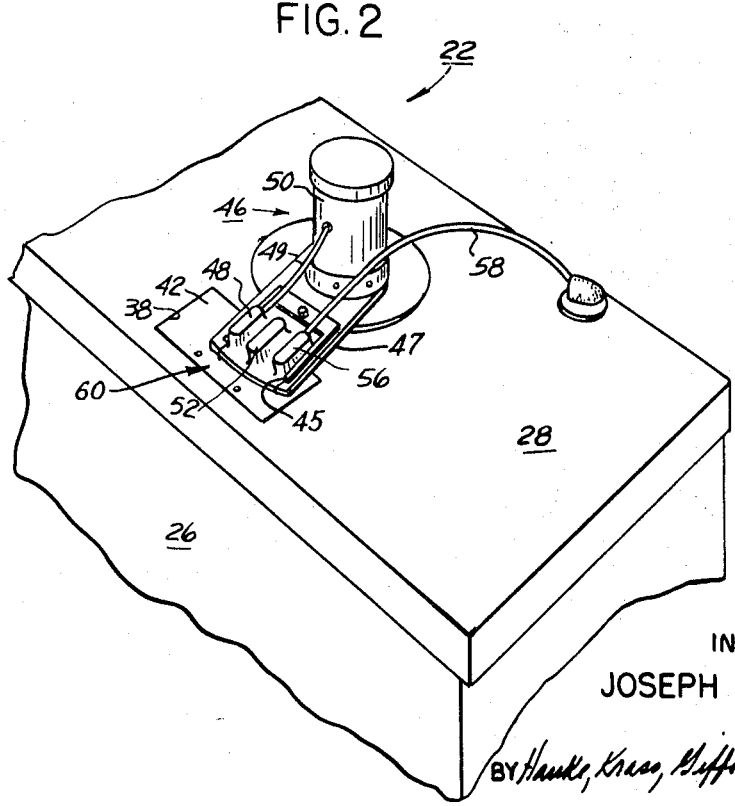
FIG. 2 is a perspective top view of the powder compacting press of FIG. 1 embodying the present invention.

With reference to FIGS. 1–3, the exemplary powder-compacting press 22 has a base 24 supporting a frame 26 on which rests a work table 28. The frame encloses a drive mechanism 30 which comprises a camshaft 33 normally supporting a plurality of cams, only two of which are shown at 25 and 32. Camshaft 33 is normally driven by any conventional drive means (not shown) to permit the multiple cams to perform the various work operations of the press in timed sequence. Cam 32 is disposed so as to engage a cam follower 31 mounted on the end of a treadle 34 and cam 25 is disposed so as to engage and actuate upon rotation a lever 23 for a purpose to be explained. The treadle 34, which is centrally pivoted in the frame 26 on a shaft 37, is biased at one end toward the cam 32 by way of spring means 27 and supports at its other end a spool member 29 for reciprocatory actuation of a ram member 36 secured to the spool member and which is movably supported below the work table 28 within a bushing 39 in the frame 26.

Upon rotation of the cam 32, the ram 36 is adapted to reciprocate a punch-actuating rod 41 of a punch and die set 40 mounted on the end of the ram 36. A die plate 42 integral with the punch set 40 is mounted within an aperture 38 in the front end of the work table 28 and is suitably secured thereto by means of bolts or the like fitting into appropriate apertures 43 (FIG. 4) provided in the die plate 42 of the punch and die set 40. The die plate 42 upon installation is preferably flush with the surface of the work table 28.

Positioned on top of the table 28 for pivotal sweeping movement around a vertical axis 51 in timed sequence as caused by actuation of the camshaft drive mechanism 30 is a station positioner assembly 46 comprising an oscillating positioner arm 47 on the end of which are supported three work stations as follows:

a. a fill station to dispense powdered material into the die cavities through a member head 48 which is supplied with powdered material by means of a flexible tube or conduit 49 from a material hopper 50, supported around the station positioner axis 51;

b. a press station provided with an anvil 52 which is adapted to be clamped down upon the die plate 42 by means of a pivotal clamp 54, FIG. 1, supported on a shaft 61 which is actuated by the lever 23 upon rotation of the cam 25. The clamp 54, as seen in FIG. 1, is provided with a pressure head 53 which is adjustable in relation to the anvil 52 by means of a microscrew 55; and c. an ejection station provided with a pickup head 56 which, in the illustrated embodiment, is connected to a source of vacuum (not shown) by means of a conduit 58 to retain the finished articles by suction above the die plate 42 after they have been ejected from the die plate. Instead of using a vacuum suction force in the pickup head 56 for disposal of the finished articles, the pickup head may be simply constructed as a mechanical sweeper, as will be explained further on.

The dispenser head 48, the anvil 52 and the pickup head 56 are all assembled as a unit 60 within an appropriate recess 45 in the end of the oscillating positioner arm 47 of the station positioner 46. The anvil 52 between the dispenser head 48 and pickup head 56 is vertically movable relative to the latter so that upon clamping down of the clamp 54 on the anvil the clamping force will not be transmitted to the adjacent dispenser head and pickup head.

With reference to FIG. 4, the improved die plate 42, as used with the improved punch and die set 40, is provided with a plurality of die cavities 62 which each receive a die bushing 63, The die cavities 62 are arranged in the center of the die plate along a line "x." The die plate is further provided with a plurality of discharge apertures 64 corresponding in number to the number of die cavities. The discharge apertures 64 are located near the die cavities in order to reduce the angular movement of the positioner arm 47 to a minimum, and the center of each of the discharge apertures is located on an arc "Y" extended from the center of its corresponding die cavity as described by the angular movement of the positioner arm 47. All of the discharge apertures are aligned linearly having their center located on a line "R" which, when extended, intersects the line "X" at the axis 51 of the positioner assembly 46. When the oscillating arm 47 is angularly positioned from the eject and pickup station to a position placing the dispenser head 48 over the die cavities 62, the pickup head 56 is positioned over the discharge apertures 64 and at the same time as the finished articles are discharged through apertures 64 the die cavities are again filled with powdered material for the next work cycle.

Figure 5:
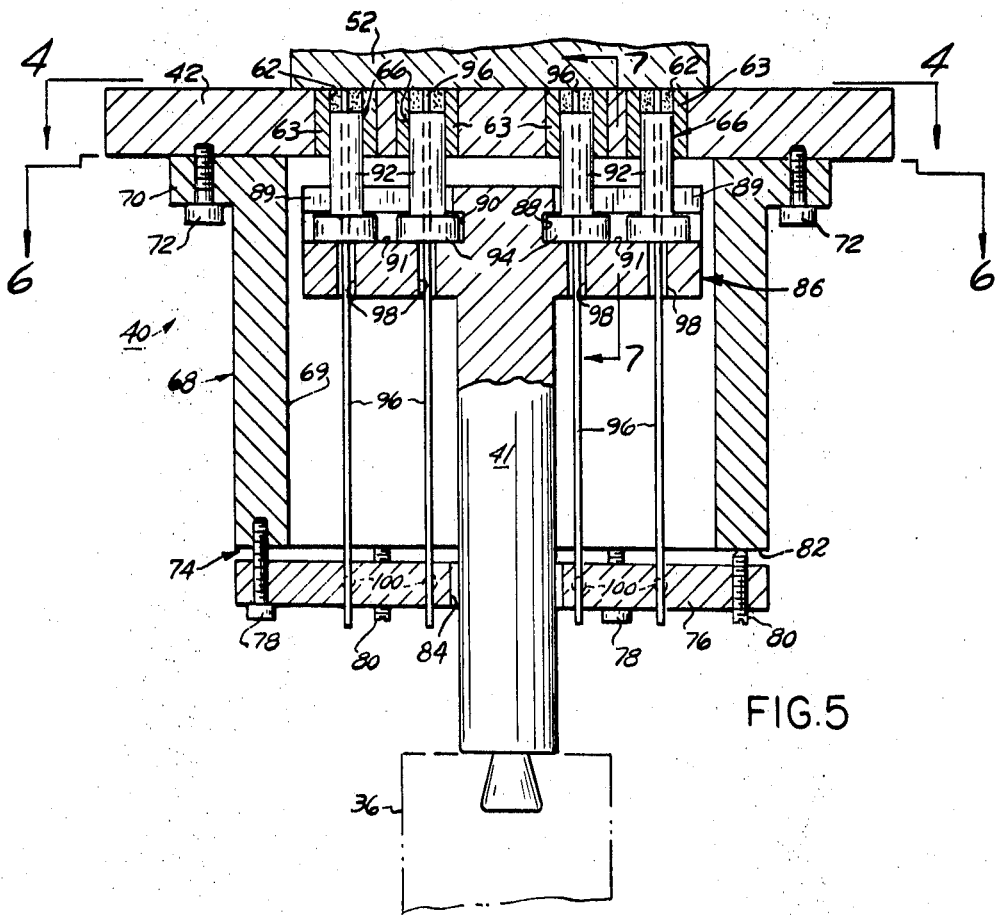
FIG. 5 is a transverse cross section through the die plate and punch housing associated with the die plate of FIG. 4.
Figure 6:
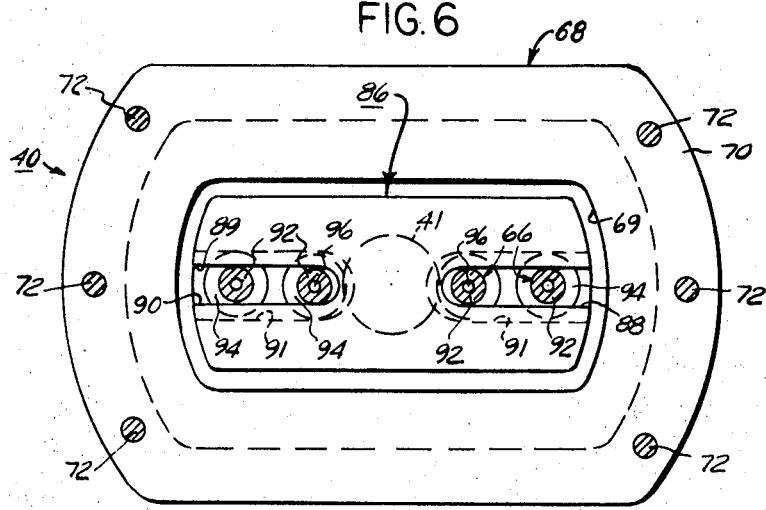
FIG. 6 is a cross section through the punch assembly within the punch housing as seen along line 6–6 in FIG. 5.

With reference to FIGS. 5–7, the present novel punch and die set assembly 40 adapted for cooperation with the improved die plate 42 comprise a punch capsule or housing 68 of substantially cylindrical configuration having an internal bore 69 in which is disposed a plurality of punches 66 for reciprocation therein. The capsule or housing 68, at its upper end, has a transverse flange 70 by means of which the capsule or housing 68 is attached to the underside of the die plate 42 by means of fasteners such as machine screws 72 or the like, so that the die plate overlies the open upper end of the capsule or housing in such way as to have all of the die cavities 62 aligned with the internal bore 69 of the capsule or housing 68.

The lower end 74 of the bore 69 of the capsule or housing 68 is closed by an adjustably positionable closure plate 76 which is secured to the housing by screws 78 in a spaced position relative thereto as may be adjusted by means of spacing screws 80 adapted to abut against the radial surface 82 of the lower end 74 of the capsule or housing upon tightening of the screws 78. The spacing adjustability of the closure plate 76 relative to the capsule or housing 68 is provided for the purpose to be described hereafter.

The closure plate 76 has a central aperture 84 for the extension therethrough of the punch actuating rod 41 which is attached to the end of the ram member 36 of the press 22. The punch actuating rod 41 extends upwardly into the internal bore 69 of the capsule or housing 68 and carries at its upper end or is integrally provided with a transversely extending punch holder 86. The punch holder 86 is provided with symmetrically disposed horizontal T-slots 88 and 90 which each have an enlarged bottom portion 91 and a narrow portion which extends through to the upper surface of the punch holder, as shown at 89, and which are adapted to receive each a pair of punches 66, in the example of structure shown, in linear alignment therein relative to the vertical axis of the punch holder.

Each of the punches 66 is comprised of a shank portion 92 adapted to extend through the narrow portion 89 of the T-slots 88—90 respectively and each is provided at its lower end with a diametrically enlarged flange portion 94 adapted for slidable insertion into the bottom portion 91 of the T-slots 88 and 90, as seen in FIG. 7, to thus retain the punches on the punch holder 86. The T-slots 88 and 90 are of sufficient length extending from the outside towards the center of the punch holder for horizontal positioning of the punches 66 into axial alignment with the die bushings 63 disposed within the die cavities 62 so as to allow the shank portions 92 of each punch 66 to each extend into an axially aligned die bushing 63, as shown in FIG. 5.

Some compressed articles, such as magnetic cores, for example, are provided with apertures, in which case core rods are provided, as shown at 96 in FIG. 5. The upper portions of the core rods 96 are adapted to extend slidably through the punches 66 and into the die cavities 62. The lower ends of the core rods extend downwardly through apertures 98 in the punch holder 86 which are axially aligned with the punches 66 and die cavities 62 and are in linear alignment with the T-slots 88 and 90. The apertures 98 are of sufficiently large diameter to permit self-adjustment of the core rods upon axial alignment of the punches 66 within the die bushings 63. The core rods 96 extend downwardly through the bore 69 of the capsule or housing 68 to be secured to the adjustable closure plate 76 for longitudinal adjustment therewith to permit individual adjustment of the core rods 96 in longitudinal direction. The closure plate 76 to which the core rods are secured is provided with a plurality of set screws 100 extending in transverse direction from the outside of the plate 76 towards the core rods so that each core rod can be individually adjusted relative to its corresponding punch. Thus, upon initial assembly of the punch and die set 40, all the core rods 96 can be longitudinally adjusted simultaneously relative to the punches and the die plate 42 by respective adjustment of the spacing screws 80 at the closure plate 76 which is then locked in that position by tightening of the screws 78. Thereafter the core rods can be individually fine adjusted by provision of the setscrews 100. The core rods, due to their attachment to the closure plate 76, will remain stationary during subsequent reciprocating movement of the punches 66 within the die bushings 63.

Thus, under actual operating conditions, after the die cavities 62 have been filled with powdered material from the dispenser head 48 and the oscillating positioner arm 47 has been repositioned to place the anvil 52 over the die cavities (which position is shown in FIG. 5) the punches 66 are being advanced upwardly through the die bushings by the timed actuation of the cam mechanism of the press as described in the following to compress the powder between the upper surface of the punches and the surface of the anvil to thus produce a compacted article. The core rods 96 remain stationary during the actuation of the punches.

It will be obvious that the core rods 96 can be omitted if desired, in which instance the punches will be solid so as to produce solid compacted articles.

Tor illustrative purpose, the synchronized and timed operation of the exemplary powder compacting press 22, as shown in FIGS. 1 to 3, is schematically as follows: after the machine is started, rotation of the camshaft 33 causes one of the cams of the multiple cam assembly, acting on suitable drive means (not shown) to angularly rotate the oscillating positioner arm 47 of the station positioner 46 to a position placing the dispenser head 48 over the die cavities 62 to fill each of the cavities with powdered material to a depth determined by the amount of withdrawal of each punch 66 (FIG. 5) of the punch and die set assembly 40 within each die cavity. Hereafter, the oscillating positioner arm 47 is caused to pivot around in timed relation to position the press station or anvil 52 over the die cavities 62, any excess powder material remaining within the dispenser head 48. In timed sequence, the pivotal anvil clamp 54 is actuated through the pivoting action of the lever 23 whose lower end is in abutment with cam 25 on the camshaft 33, as seen in FIG. 1, to pivot the clamp 54 around the clamp support shaft 61 to engage the clamp head 53 with the top of the anvil 52 so as to press the anvil 52 down upon the die plate 42 to completely cover the die cavities 62, as seen in FIG. 5. Simultaneously, the punches 66 (FIG. 5) within the die cavities 62 are advanced upwardly under actuation by the cam 32 acting on the ram treadle 34 which causes the ram 36 to be moved upwardly to compress the loosely dispensed powder within the die cavities between the head of the punches and the bottom surface of the anvil 52. Thereafter, the positioner oscillating arm 47 is swung in timed sequence to a position placing the pickup head 56 over the die cavities 62 to pick up the compressed articles from each of the die cavities when they are ejected from the cavities by a further advance of the punches 66 through the die cavities.

Figure 8:
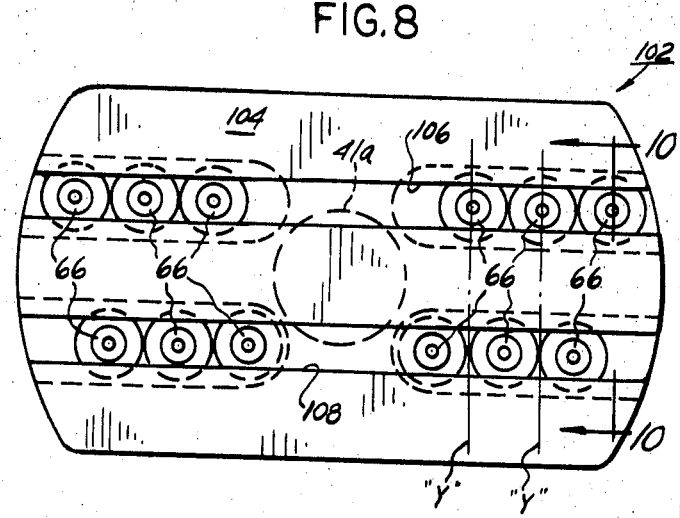
FIG. 8 is a top plan view of an alternate embodiment of a punch holder.
Figure 10:
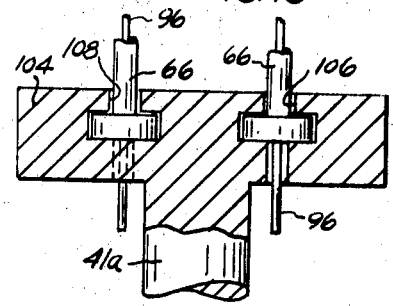
FIG. 10 is a cross section through the punch holder of FIG. 8 through line 10–10.
Figure 9:
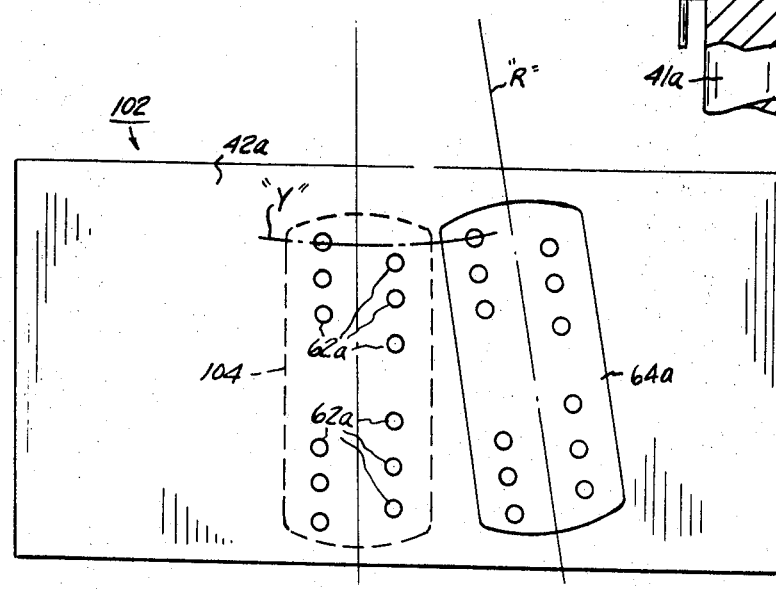
FIG. 9 is a plan view of a die plate associated with the punch holder of FIG. 8.

With reference now to FIGS. 8 to 10, there is illustrated an alternate embodiment of a punch and die set assembly 102 which provides a multiple arrangement of linearly positioned punches 66 so as to provide an increased output during each work cycle.

As illustrated in FIG. 8 and 10, the punch holder 104 of the punch and die assembly 102, which in assembly is disposed for reciprocation within a housing as in FIG. 5, is in this instance provided with a pair of parallel extending T-slots 106 and 108 respectively which extend from edge to edge across the punch holder on both sides of the centrally disposed punch actuating rod 41a extending from the punch holder. Each of said T-slots is adapted to receive a plurality of punches 66 linearly arranged therein. The die plate 42a, as illustrated in FIG. 9, is accordingly provided with a pair of parallel arranged pluralities of die cavities 62a which are disposed in the same order as the punches 66 for extension of each of the punches into a corresponding cavity as described earlier in connection with FIG. 5.

As can be seen specifically from FIGS. 8 and 9, the pair of punches 66 and die cavities 62a are arranged in a staggered relationship, that is, they are arranged such that the punches in the T-slot 106 as well as their corresponding die cavities are positioned in relation to their opposite parallel counterparts as to lie each on an arc "Y" which when extended from their center passes through two adjacent punches, respectively die cavities, as indicated. The arc "Y" on which each of the die cavities and punches is disposed is determined by the angular sweep of the positioner arm 47 across the die plate. This overlapping arrangement is provided to prevent crowding of the compacted articles after ejection from the die cavities and subsequent disposal through the discharge aperture 64a which is located in the die plate 42a adjacent the die cavities 62a but positioned at an angle thereto and along a line "R" which, when extended, intersects the axis 51 of the station positioner. Instead of a single discharge aperture a plurality of discharge apertures corresponding in number to the number of die cavities could be provided positioned along the line "R."

As a further obvious modification, the punches and die cavities could be arranged linearly along lines intersecting at the center of the punch holder respectively at the center of the die plate and they would likewise be arranged in staggered relationship relative to the adjacent row of punches or die cavities.

With the improved construction of the punch and die sets herein described in conjunction with the improved arrangement of the work station positioner, the operation of the powder compacting press of the type herein referred to is being considerably improved and facilitated by first: reducing the angular oscillating movement of the oscillating positioner arm; secondly: simplifying the cam design of the work station positioner mechanism; thirdly: reducing the cost of the press operation; fourthly: increasing the speed of the press and, finally: reducing wear and tear on the mechanism of the machine.

The present invention may be embodied in other forms without departing from the spirit and essential characteristic thereof, therefore, the present embodiment is to be considered in all respects as illustrative only and not restrictive, the scope of the invention being indicated by the appended claims rather than by the foregoing description.

I claim:
1. In an apparatus for making articles from powdered material, the improvement comprising:
- a die plate provided with a plurality of die cavities disposed in a predetermined array;
- a plurality of discharge apertures provided in said die plate and disposed in said predetermined array in an angularly offset position from said die cavities such that each of said discharge apertures corresponds to a similarly positioned die cavity in said array;
- multiple punch means disposed below said die plate, each extending within one of said die cavities for reciprocatory movement therein;
- an oscillating work station positioner disposed above said die plate for angular movement across said die plate around a vertical axis positioned remote from said die plate, said work station positioner being provided with multiple work stations adapted to be selectively positioned over said die cavities upon angular movement of said oscillating work station positioner;

said work stations comprising:
- a fill station having a dispenser head adapted to be supplied with powdered material;
- a press station having an anvil; and
- an eject station having a pickup head, said press station being disposed between said fill station and said eject station so that in a first position of said oscillating work station positioner said fill station is disposed over all said die cavities to fill said cavities with powdered material;
- in a second position of said work station positioner said press station is positioned over all said die cavities to compress said powdered material into a compacted article by means of said reciprocable punches advancing against said anvil; and
- in a third position of said work station positioner said eject station is positioned over all said die cavities for ejection of said compacted articles from all said die cavities into said pickup head; the arrangement of said plurality of work stations in relation to said die cavities and discharge apertures being such that during operation of said apparatus when said work station positioner is in said first position to fill said die cavities with powdered material said compacted articles from a preceding work cycle are simultaneously released from said pickup head through each of said discharge apertures corresponding to each of said die cavities.

2. In the apparatus as defined in claim 1, in which said die cavities are arranged along a straight line, and in which said punch means comprises a punch holder having a punch-actuating rod, power means operably connected to said punch-actuating rod for reciprocation thereof, said punch holder being adapted to support a plurality of punches for reciprocation therewith, said plurality of punches for reciprocation therewith, said plurality of punches being arranged linearly in spaced relationship corresponding to said linearly arranged die cavities for extension of each of said plurality of punches into a corresponding cavity of said plurality of die cavities.

3. In the apparatus as defined in claim 2, said plurality of discharge apertures corresponding in number to said plurality of die cavities, the center of each of said discharge apertures being disposed on an arc of a circle extended from the center of its corresponding die cavity, the center of said circle being at the axis of said oscillating work station positioner.

4. In the apparatus as defined in claim 3, the center of said linearly aligned die cavities being on a common radius and the center of said discharge apertures being on a second common radius of a plurality of said arcs of a circle.

5. A punch and die assembly for a powder compacting press comprising:
- a die plate;
- a housing attached to one side of said die plate;
- a punch holder having an actuating rod reciprocably disposed within said housing, said punch holder comprising a head provided with at least one linear T-slot extending from an outer edge of said head across to another outer edge thereof;
- a plurality of punches disposed within said T-slot for retainment therein and for reciprocation with said punch holder;
- said die plate being provided with a first set of apertures corresponding in number to said plurality of punches, each of said punches extending into a corresponding one of said first set of apertures for reciprocation therein; and
- a second set of apertures within said die plate angularly offset from said first set of apertures in a radially aligned relationship.

6. In the punch and die assembly as defined in claim 6, said T-slot, said plurality of punches and first set of apertures being disposed in linear alignment normal to the axis of said punch holder.

7. In the punch and die assembly as defined in claim 5, said first set of apertures comprising die cavities and said second set of apertures defining discharge apertures.

8. In the punch and die assembly as defined in claim 5, the provision of a plurality of core rods each of which extends slidably though each of said plurality of punches and through said head of said punch holder for stationary adjustable attachment to said housing.

PEN-109-A
PO-1050
(5/69)

UNITED STATES PATENT OFFICE
CERTIFICATE OF CORRECTION

Patent No. 3,574,892         Dated April 13, 1971

Inventor(s)  JOSEPH E. SMITH

It is certified that error appears in the above-identified patent and that said Letters Patent are hereby corrected as shown below:

IN THE SPECIFICATION

Column 3, line 61, after "a" cancel "member" and insert - - dispenser

IN THE CLAIMS

Column 8, lines 4 and 5, cancel "said plurality of punches for reciprocation therewith,"

Signed and sealed this 13th day of July 1971.

(SEAL)
Attest:

EDWARD M. FLETCHER, JR.
Attesting Officer

WILLIAM E. SCHUYLER
Commissioner of Pat